US006708933B2

United States Patent
Girodo

(10) Patent No.: US 6,708,933 B2
(45) Date of Patent: Mar. 23, 2004

(54) DETACHABLE ATTACHMENT CLAMP, IN PARTICULAR FOR ELECTRIC WIRE HARNESSES ON VEHICLES

(75) Inventor: Franco Girodo, Tavagnasco (IT)

(73) Assignee: ITW Automotive Italia S.R.L., Strada Settimo (IT)

( * ) Notice: Subject to any disclaimer, the term of this patent is extended or adjusted under 35 U.S.C. 154(b) by 0 days.

(21) Appl. No.: 10/207,393

(22) Filed: Jul. 30, 2002

(65) Prior Publication Data
US 2003/0033696 A1 Feb. 20, 2003

(30) Foreign Application Priority Data
Jul. 31, 2001 (IT) ...................... TO2001A0764

(51) Int. Cl.[7] ................................. F16L 3/10
(52) U.S. Cl. ................ 248/74.2; 248/316.5; 248/316.7; 248/231.9; 24/458; 24/327; 24/559; 24/561
(58) Field of Search .............................. 248/62, 63, 65, 248/68.1, 71, 72, 73, 74.1, 74.2, 316.1, 316.7, 316.5, 231.9, 228.7, 229.16, 229.26, 230.7, 67.5, 67.7; 24/458, 559, 561, 562, 327, 482, 487, 530–532, 457

(56) References Cited

U.S. PATENT DOCUMENTS

| 2,256,887 A | * | 9/1941 | Beck .......................... 452/176 |
| 3,163,712 A | * | 12/1964 | Cochran ..................... 174/164 |
| 3,345,027 A | * | 10/1967 | Taylor ...................... 248/176.1 |
| 4,212,303 A | * | 7/1980 | Nolan ......................... 606/120 |
| 4,235,404 A | * | 11/1980 | Kraus ......................... 248/74.3 |
| 4,564,163 A | * | 1/1986 | Barnett ......................... 248/71 |
| 4,669,688 A | * | 6/1987 | Itoh et al. .................. 248/74.2 |
| 4,835,824 A | * | 6/1989 | Durham et al. ............... 24/339 |
| 4,958,792 A | * | 9/1990 | Rinderer .................... 248/74.2 |
| 5,257,768 A | * | 11/1993 | Juenemann et al. ........ 248/604 |
| 5,535,969 A | * | 7/1996 | Duffy, Jr. ................... 248/68.1 |
| 5,588,683 A | * | 12/1996 | Schliessner .................. 285/62 |
| 5,820,048 A | * | 10/1998 | Shereyk et al. ............ 248/68.1 |

FOREIGN PATENT DOCUMENTS

| GB | 2005758 | * | 4/1979 | ............... 248/68.1 |
| JP | 411022863 A | * | 1/1999 | |
| JP | 2001165357 A | * | 6/2001 | |

* cited by examiner

Primary Examiner—Ramon O. Ramirez
Assistant Examiner—Jon Szumny
(74) Attorney, Agent, or Firm—Lowe Hauptman Gilman & Berner LLP

(57) ABSTRACT

A clamp includes a locking element (4) and an element (6) for hooking to a support (3). The hooking element (6) is made integral with the locking element and is equipped with first hooking means (14) and second hooking means (16), which are of different types and are located on opposite sides of the hooking element (6). The locking element (4) includes a pair of jaws (18) that are arranged to mate together and are made integral, on either side, with the hooking element, as well as detachable locking means (26, 27, 28) for connecting the jaws (18) together in a working position in which the jaws (18) lie essentially parallel and abut one another.

18 Claims, 1 Drawing Sheet

DETACHABLE ATTACHMENT CLAMP, IN PARTICULAR FOR ELECTRIC WIRE HARNESSES ON VEHICLES

TECHNICAL FIELD

This invention pertains to a detachable attachment clamp, in particular for harnessing electric wires or other similar elements on vehicles.

BACKGROUND ART

It is known that, for attaching bundles of electric wires to vehicle bodies, clamps are used that include a locking element that can be locked to the bundle of wires to be attached and a hooking element that is made integral with the locking element.

The locking element generally consists of a flexible tongue that slides into a seat in the hooking element so as to form with the tongue a ring or bow in which a wire bundle to be attached is secured; the tongue is selectively locked in the seat in progressively tighter insertion positions so as to form by ratcheting means a more or less wide bow with the seat. In this way it is possible to lock wire bundles that contain different numbers of wires, even of widely differing diameters, with equal efficiency.

The hooking element is designed in turn to mate detachably with a support mounted on the vehicle body. The supports that are actually used in vehicles are of two kinds: threaded bolts that are usually welded on the vehicle body projecting outward and that can be detachably inserted into a hooking-element seat that is equipped with ratcheting means (so-called "tuckers"), or simple holes that are suitable for detachably receiving appropriate expansion bolts that are integral with the hooking element.

In practice, the wire bundles are preassembled with a number of clamps that are already locked to said bundles and are arranged in preset positions that essentially correspond to the positions of the supports prearranged on the vehicle body, and the wire bundles are then suspended and arranged, whereby they are ultimately locked to the vehicle body by simply forcing the hooking element of each clamp onto a corresponding support on the vehicle body. Nevertheless, the same vehicle can have supports of both kinds described above at the same time, and therefore wiring specialists find it necessary to deal with clamps of two different types that each connect to two different types of supports. This creates handling problems, resulting in high installation costs, even taking into account the fact that the above-mentioned clamps, once locked in position on the wire bundles, can be removed but are no longer usable because, once the locking tongue is locked, the inserted part of the locking tongue is cut and, in any case, the ratcheting means that lock the tongue prevent it from being removed unless it is torn away or severed.

These problems are exacerbated by the fact that, because of working tolerances, the supports that are prearranged on the vehicle body may sometimes not be ideally positioned as called for by the design. Problems like this can also be encountered when attaching other wire-like elements, for instance, tubes, to the vehicle body.

SUMMARY OF THE INVENTION

One purpose of this invention is thus to remedy the above-described drawbacks by means of a clamp that can be used equally well on both types of support that exist today and, optionally, on other types of supports that may be available in the future and that also allow the hooking element to move within a circumscribed area relative to the attachment position of the clamp on the wire bundle, i.e., to be able to correct any positioning errors either of the clamps or of the supports on the vehicle body, all the while reducing basic production costs, ensuring a compact design, and providing greater ease of installation.

The invention is based on a clamp, especially for attaching electric wires to a vehicle body, whereby said clamp includes a locking element and an element for hooking to a support and whereby the hooking element is made integral with the locking element; characterized by the fact that the locking element is equipped with first and second hooking means that are different and are mounted on opposite sides of the hooking element; and by the fact that, in combination, the locking element includes a pair of jaws that are arranged facing one another and, on either side, are made integral with the hooking element and detachable locking means for connecting the jaws together in a working position in which the jaws lie essentially parallel and are arranged abutting against one another.

In particular, the jaws expand laterally and overlap the hooking element, to which they are attached by plastic hinges that are designed in such a way as to allow the jaws to selectively assume a working position and an at-rest position, in which the jaws are expanded to form a V-shaped opening in order to allow a number of mating elements that are to be locked to be inserted between said jaws.

In this way, the same clamp can be attached equally well to either of the two different kinds of supports simply by rotating the clamp 180° so as to put the hooking element in the appropriate position, thus allowing the clamp to close on the elements to be locked (wires or tubes) in the same position and on the same side of the hooking element in every case. Moreover, because of the above-mentioned structure, it is also possible to make small adjustments to the position of the hooking element relative to the locking element, whereby said adjustments are made possible by the presence of the above-mentioned plastic hinges. This makes it possible to correct any minor positioning errors either of the clamp itself on the elements to be attached, for example, a bundle of electric wires, that can thus be pre-wired at low cost, or of the supports on the vehicle body.

Finally, the clamp that is the object of the invention can easily be produced as a single piece by molding and injecting a plastic.

BRIEF DESCRIPTION OF THE DRAWINGS

Other characteristics and advantages of the invention will be understood from the description presented below of a non-limiting embodiment, which refers to the figures in the attached drawings, where.

DETAILED DESCRIPTION OF THE INVENTION

Figure 1:
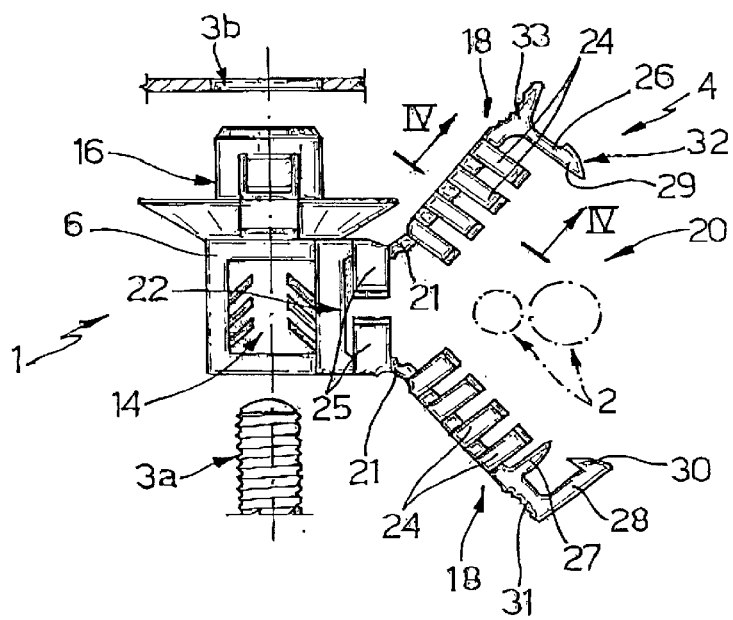
FIG. 1 shows a side view in elevation of a detachable clamp designed according to the invention, in a first working configuration.

With reference to FIGS. 1–4, in all cases 1 refers to an attachment clamp which, in the non-limiting embodiment shown, is suitable for the pre-harnessing and quick locking of bundles of electric wires 2 (which are known and only two of which are indicated schematically in FIG. 1) and a vehicle body, not shown, by connecting to supports 3, of a known type; two different types of supports, respectively a threaded bolt or "tucker" 3a that is welded to the body and projects outward and a hole 3b that runs through the body, are shown in FIG. 1.

Clamp 1 includes a locking element 4 for the elements to be attached to the vehicle body, in this case a number of electric wires 2, even if they are of considerably different sizes, and a hooking element 6 for attaching to a corresponding support 3a or 3b.

According to a first feature of the invention, a hooking element 6 simultaneously includes first hooking means 14 and second hooking means 16, which are able, respectively, to attach to different supports; in the non-limiting case shown here, the hooking means 14 and 16 are both of a known type and therefore are not described in detail; they are of a type that can connect means 14 to a bolt 3a and means 16 to a hole 3b.

The hooking means 14 and 16 which, being designed to attach in each case to supports having circular symmetry (a hole or bolt), both exhibit axial symmetry and are located on opposite sides of the hooking element 6 and are integral with it; in particular, the hooking means 14, 16 are arranged facing in opposite directions along a working axis A, and the hooking element 6 is made of a box-type body (in the case in question, essentially in the shape of a parallelepiped) that is injection-molded of a synthetic plastic material, as are hooking means 14, 16.

Figure 2:
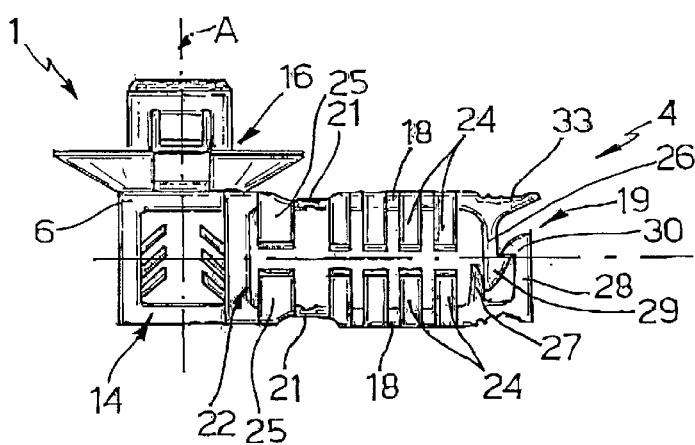
FIG. 2 shows a side view in elevation of the clamp of FIG. 1, in a second working configuration.
Figure 3:
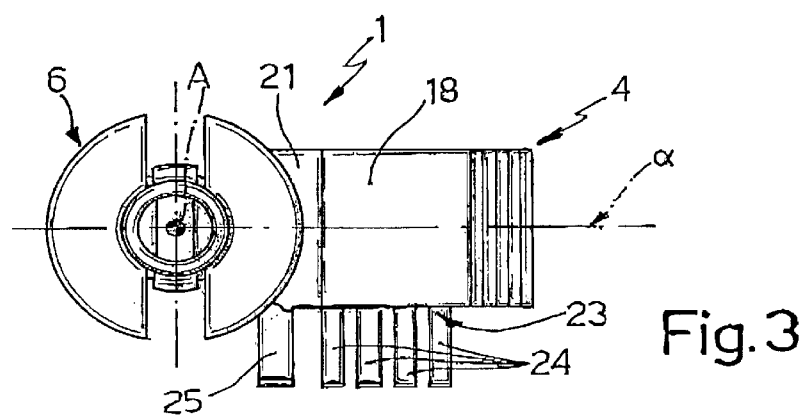
FIG. 3 shows a top view of the clamp of FIG. 1.
Figure 4:
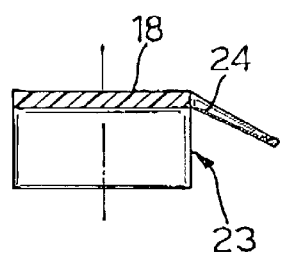
FIG. 4 shows a cutaway view along line IV—IV of a detail of the clamp of FIG. 1.

According to the invention, unlike known locking elements with clamps, locking element 4 includes a pair of jaws 18 that are facing one another and are produced as one piece on either side of the hooking element 6 and the detachable locking means, which are referenced throughout as 19 (FIG. 2), for connecting the jaws 18 together in a working position, shown in FIG. 2, in which the jaws 18 are essentially parallel to one another and are arranged to abut one another.

In particular, the jaws 18 laterally overhang the hooking element 6, to which they are connected by means of plastic hinges that are designed to allow the jaws 18 to assume selectively the working position (FIG. 2) and an open or at-rest position, shown in FIG. 1, in which the jaws 18 are expanded to form a V-shaped opening 20; according to the invention, the jaws 18 are of such a size (especially in the longitudinal direction, i.e., in the overhang direction of element 6) as to allow a number of mating elements that are to be locked (in the case in question, wires 2) to be inserted between them.

Hereinafter, the term "plastic hinge" refers to structural elements, regardless of how they are shaped, that are able, by elastic, plastic, or elasto-plastic deformation, to permit the corresponding elements attached to them to swivel.

In the case in question, the above-mentioned plastic hinges are composed of respective flexible, elastically deformable tongues 21 that connect each jaw 18 to one side 22 of the hooking element 6, which is arranged parallel to axis A. According to another characteristic of the invention, due to deforming (by elastic or, to the extent possible, plastic deformation), the tongues 21 are long enough to permit relative movements between the jaws 18 that are locked in the working position (FIG. 2) and the hooking element 6, whereby these movements are not necessarily rotational motions; rather, they can also be motions of relative translation either in the direction parallel to axis A or in the direction parallel to the longitudinal extension of the jaws 18.

Corresponding to a front edge 23 (indicated only in FIGS. 3 and 4), the jaws 18 are equipped with a number of respective elastically deformable fins 24 that overhang an edge 23 in a transverse direction that is slightly oblique (20–30°) relative to a plane α that passes through axis A.

Corresponding to a forward edge that is parallel to and in line with the edge 23, the tongues 21 are also equipped with respective elastically deformable fins 25 that extend so as to overhang the above-mentioned forward edge, along a direction that is essentially perpendicular to the plane α, i.e., to the working axis A.

Detachable locking means 19 (FIG. 2) for the jaws 18 include a first rib 26, which is essentially rigid and is supported by one of the jaws 18, and a second and third ribs, 27 and 28, respectively, which mate with other jaw 18; the ribs 26 and 28 are equipped with respective additional sawtooth-shaped spikes 29, 30. Once connected, said spikes 29, 30 are able, with the jaws 18 in the working position of FIG. 2, to detachably lock the rib 26 between ribs 28 and 27, abutting the side of rib 27 that faces toward rib 28.

With the jaw 18 in the above-mentioned working position, the ribs 26, 27, and 28 are thus all oriented parallel to working axis A, i.e., perpendicular to plane α; and a portion 31 (FIG. 1) of the jaw 18 that is equipped with ribs 27, 28 which connect them is of such a size as to be deformable enough to make it possible, by elasticity, to connect said spikes 29, 30 together in a detachable manner.

In the direction of the rib 28, the spike 29 is also equipped with an oblique surface 32 (FIG. 1) which, in operation, is able to work together with the spike 30 so as to move the rib 28 elastically apart from rib 27. The portion 31 and a corresponding portion 33 of other jaw 18 are equipped with grasping knurls, and the portion 33 goes on to overhang the rib 26 to form a maneuvering end for the jaw 18.

In operation, the clamp 1, which is injection-molded as a single piece out of an integral synthetic plastic, is prepositioned with the jaws 18 opened (as shown in FIG. 1) in the desired position along a bundle of wires (or tubes) 2 to be harnessed, with the hooking element 6 pivoted in such a way as to provide the hooking means 14 or 16 that are needed to work with supports 3a or 3b if they are present on the vehicle body in the corresponding positions. Then, the jaws 18 are closed and detachably locked by means of spikes 29, 30, in the position shown in FIG. 2; this maneuver is carried out manually (or by means of appropriate automatic mechanisms) by acting on the portion 31 and on a corresponding overhanging portion 33. If the tongues 21 are sufficiently long and deformable, at the instant when the hooking element 6 locks on to the support 3a or 3b, any minor positioning errors resulting from installation tolerances of the vehicle body are corrected. At worst, if the tongues do not have tubes or wires arranged between them, it is possible to bend tongues 21 by 180°, so as to turn the locking means 14 or 16 toward the supports 3a, 3b as needed, even if the clamp 1 is not turned in the proper position at the time when pre-harnessing is done.

What is claimed is:

1. A clamp for harnessing wires, comprising a locking element for retaining the wires and a fixing element for fixing the clamp to a support, wherein the fixing element is made integral with the locking element in a unitary body;

the locking element includes a pair of jaws detachably lockable in a working position to retain the wires therebetween;

said jaws laterally project from a side portion of said fixing element and are respectively connected to said fixing element by a pair of plastic hinges which allow said jaws to selectively assume said working position and an at-rest position in which the jaws are expanded to form a V-shaped opening; and the fixing element comprises first fixing means and second fixing means for fixing the clamp to two different types of support, respectively, said fixing means facing towards opposite sides of the fixing element.

2. A clamp for harnessing electric wires, comprising a locking element (4) and a hooking element (6) for fixing the clamp to a support, wherein the hooking element (6) is made integral with the locking element (4);

the hooking element (6) comprises first hooking means (14) and second hooking means (16) which are of different types and are located on opposite sides of the hooking element (6);

the locking element (4) includes a pair of jaws (18) that are arranged to mate together and are made integral on either side with the hooking element (6), and detachable locking means (19) for connecting said jaws (18) together in a working position in which the jaws (18) lie essentially parallel to one another and abut one another;

said jaws (18) laterally overhang said hooking element and are connected to said hooking element by means of plastic hinges (21), which allow said jaws (18) to selectively assume said working position and an at-rest position, in which the jaws (18) are expanded to form a V-shaped opening (20); and said overhanging jaws are sized to allow a number of wires to be inserted between the jaws.

3. The clamp according to claim 2, wherein said plastic hinges are made of respective flexible and elastically deformable tongues (21) that connect each of said jaws (18) to a face (22) of said hooking element (6).

4. The clamp according to claim 3, wherein said first and second hooking means (14, 16) are oriented facing one another along a working axis (A) that is parallel to said face (22) of the hooking element (6), to which the jaws (18) are connected via said tongues.

5. The clamp according to claim 4, wherein said tongues (21) are of such a length as to allow, by deforming, relative movements between said jaws (18) that are locked in said working position and said hooking element (6).

6. The clamp according to claim 5, wherein said tongues (21) are equipped, corresponding to a forward edge, with respective elastically deformable fins (25) that overhang said forward edge along a direction that is essentially perpendicular to a plane that passes through said working axis (A).

7. The clamp according to claim 5, wherein, corresponding to a forward edge (23), said jaws (18) are equipped with a number of respective, elastically deformable fins (24) that overhang said forward edge (23) along a direction that is essentially transverse to a plane that passes through said working axis (A).

8. The clamp according to claim 2, wherein said detachable locking means (19) for jaws (18) include a first, essentially rigid rib (26) that is supported by a first one of said jaws (18) and a second rib (27) and a third rib (28) that mate with a second one of said jaws (18); and the first rib (26) and the third rib (28) are equipped with respective additional sawtooth-shaped spikes (29, 30) to detachably lock said jaws (18) in said working position, with the first rib (26) located between the second rib (27) and the third rib (28) and abutting a side of the second rib (27) that faces toward the third rib (28).

9. The clamp according to claim 8, wherein with said jaws (18) in said working position, said ribs (26, 27, 28) are all oriented parallel to a working axis (A) and wherein a portion (31) of said second jaw (18) that connects the second rib (27) to the third rib (28) is sufficiently deformable to make it possible, by elasticity, to detachably lock said spikes (29, 30) together.

10. The clamp according to claim 9, wherein, toward the third rib (28), said spike (29) of said first rib (26) is equipped with an oblique surface (32) configured to work together with the spike (30) of said third rib (28) to move the third rib apart elastically from the second rib (27) when the jaws are moved into the working position.

11. The clamp according to claim 10, wherein said portion (31) of said second jaw (18), which connects said second and third ribs (27, 28), and a corresponding portion (33) of the first jaw (18) are equipped with grasping knurls, and the corresponding portion (33) goes on to overhang said first rib (26) to form a maneuvering end.

12. A clamp for harnessing wires, comprising a locking element and a fixing element for fixing the clamp to a support, wherein the fixing element is made integral with the locking element;

the fixing element comprises two fixing means of two different types for fixing the clamp to two different corresponding types of support, respectively;

the locking element includes a pair of jaws made integral with the fixing element, and locking means for detachably locking said jaws together in a working position; and wherein said jaws laterally overhang said fixing element and are connected to said fixing element by means of plastic hinges which allow said jaws to selectively assume said working position and an at-rest position in which the jaws are expanded to form a V-shaped opening.

13. The clamp of claim 12, wherein said two fixing means function independently of each other to fix the clamp to said two different corresponding types of support, respectively.

14. The clamp of claim 12, wherein said two fixing means include first fixing means for fixing said clamp to a hole formed in a substrate and second fixing means for fixing said clamp to a post.

15. A clamp for harnessing wires, comprising a locking element for retaining the wires and a fixing element for fixing the clamp to a support, wherein the fixing element is made integral with the locking element in a unitary body;

the locking element includes a pair of jaws detachably lockable in a working position to retain the wires therebetween;

said jaws laterally project from a side portion of said fixing element and are respectively connected to said fixing element by a pair of plastic hinges which allow said jaws to selectively assume said working position and an at-rest position in which the jaws are expanded to form a V-shaped opening; and each of said jaws includes
a base portion;
at least one locking tooth; and
between said tooth and the respective plastic hinge, a plurality of elastically deformable fins projecting from said base portion towards the other jaw when the jaws are releasably locked in the working position by the locking teeth of said jaws.

16. The clamp according to claim 15, wherein said fixing element has a working direction in which the clamp is to be moved in order to be fixed to a support by said fixing element; and when the jaws are locked in the working position, the base portion of each of said jaws extends substantially perpendicular to the working direction of said fixing element and the fins of said jaw extend obliquely with respect to the working direction of said fixing element.

17. The clamp according to claim 15, wherein said plastic hinges are flexible and elastically deformable tongues that connect the base portions of said jaws to said side portion of said fixing element, respectively.

18. The clamp according to claim 17, wherein each of said plastic hinges has a thickness dimension smaller than the side portion of said fixing element and the base portion of the respective jaw.

* * * * *